June 22, 1954
J. F. CLAYTON ET AL
2,682,000
SYSTEM FOR MEASURING RADIOACTIVITY
Filed May 31, 1951
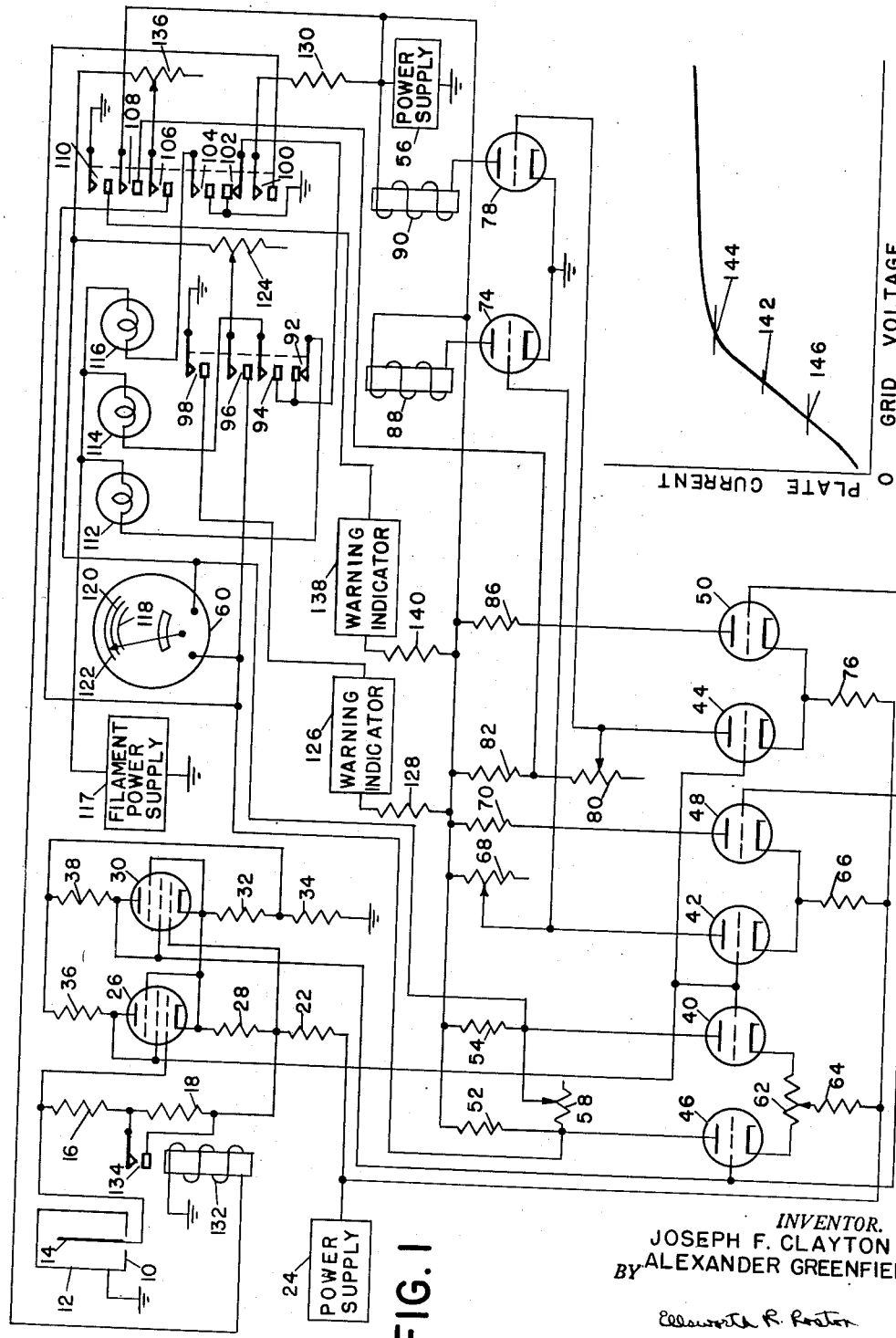
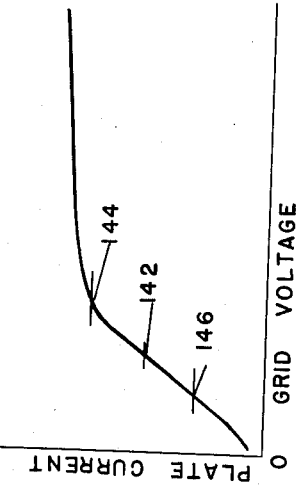
FIG. 2
FIG. 1
INVENTOR.
JOSEPH F. CLAYTON
BY ALEXANDER GREENFIELD
Ellsworth R. Roster
ATTORNEY Patented June 22, 1954

2,682,000

UNITED STATES PATENT OFFICE 2,682,000

SYSTEM FOR MEASURING RADIOACTIVITY

Joseph F. Clayton and Alexander Greenfield, Detroit, Mich., assignors to Bendix Aviation Corporation, Detroit, Mich., a corporation of Delaware Application May 31, 1951, Serial No. 229,227

8 Claims. (Cl. 250—83.6)

This invention relates to a system for measuring the intensity of radioactivity and more particularly to a system for accurately measuring the intensity of radioactivity over a wide range of values.

In recent years, the development of uses for atomic energy, both for peace and war, has proceeded at a rapid pace. Because of the potentially widespread applications for atomic energy resulting from these developments, it has become extremely urgent to make available for general use apparatus for measuring the intensity of radioactivity in a particular locality and for providing an instantaneous indication of the measurement. The apparatus should be capable of measuring the radioactivity over a wide range of values and should provide distinct warnings, either visual or audible or both, when the radioactivity approaches a danger level. The apparatus should also be portable and relatively inexpensive in order to have widespread use in such civilian places as the home, office and factory as well as in ships, airplanes and other equipment having possible military application.

Until now, satisfactory apparatus has not been developed in spite of considerable efforts by many people. Some of the apparatus has been unsatisfactory because it has not provided an accurate measurement of the radioactivity under ordinary conditions. Other apparatus has not measured the radioactivity over a sufficiently wire range or has been too complex, bulky or expensive.

This invention provides apparatus for accurately measuring the intensity of radioactivity over a wide range of values. The apparatus minimizes any errors in measurement by producing two voltages, one unaffected by the radioactivity to serve as a reference level and the other varied from the reference level in accordance with the intensity of radioactivity. The apparatus operates to obtain an indication of the intensity of radioactivity by a comparison of the variable voltage and the reference voltage. An instantaneous reading of the intensity of radioactivity is provided by an indicator having a plurality of scales, each scale being adapted to cover a different range, and by a switching circuit operative to specifically point out the scale to be read.

An object of this invention is to provide apparatus for accurately measuring the intensity of radioactivity in a particularly locality.

Another object of the invention is to provide apparatus of the above character for providing an instantaneous and reliable indication of the intensity of radioactivity over a wide range of values.

A further object is to provide apparatus of the above character having an indicator with a plurality of scales for showing different ranges of radioactivity and a switching circuit operative on the indicator to point out instantaneously the scale that should be read.

Still another object is to provide a system of the above character for giving a definite warning when the radioactivity approaches a danger level.

A still further object is to provide a system of the above character which is relatively light, compact and inexpensive and which has a minimum number of parts connected in an electrical and mechanical arrangement to operate for long periods of time without any requirements for repair.

Other objects and advantages will be apparent from a detailed description of the invention and from the appended drawings and claims.

In the drawings:

Figure 1 is a circuit diagram of one embodiment of the invention; and

Figure 2 is a curve illustrating the operational characteristics of an important tube in the circuit shown in Figure 1.

In one embodiment of the invention, an ionization chamber 10 is provided. The chamber includes a sealed cylinder 12 made from brass or copper or any other material with a high electron density. A suitably pressurized gas such as argon is contained within the cylinder, and a rod 14 is axially disposed within the cylinder in insulated relationship to the cylinder. The cylinder 12 is grounded and a negative voltage such as —160 volts, is applied on the rod from a series circuit including resistances 16, 18 and 22 and a power supply 24 adapted to supply a negative voltage. The resistances 16 and 18 have values of approximately 10,000 and 30,000 megohms, respectively, and the resistance 22 has a value of approximately one megohm or less.

The rod 14 is connected to the grid of a pentode 26 having its cathode and suppressor grid connected to the power supply 24 through a resistance 28 and the resistance 22 in series. The cathode and suppressor grid of a pentode 30 are connected to the cathode of the tube 26 and to a resistance 32, which is in series with a grounded resistance 34. The control grid of the pentode 30 is connected to the common terminal between the resistances 22 and 28. The plates and screen grids of the pentodes 26 and 30 are connected through equal resistances 36 and 38, respectively, to the common terminal between the resistances 32 and 34.

Connections are also made from the plate of the tube 26 to the grids of triodes 40, 42 and 44 and from the plate of the tube 30 to the grid of tubes 46, 48 and 50. The plates of the tubes 46 and 40 are connected through equal resistances 52 and 54, respectively, to a positive power supply 56; to a stationary contact and the movable contact, respectively, of a potentiometer 58; and to the terminals of an indicator 60. The cathodes of the tubes 46 and 40 are connected to the stationary contacts of a potentiometer 62, the movable contact of which is connected to a resistance 64. The resistance 64 is in turn connected to the power supply 24.

The cathodes of the tubes 42 and 48 are connected through a common resistance 66 to the power supply 24, and the plates of the tubes are respectively connected to the movable contact of a potentiometer 68 and to one side of a resistance 70. Connections are made from a stationary contact of the potentiometer 68 and the other side of the resistance 70 to the power supply 56. A connection is also made from the plate to the tube 42 to the grid of a tube 74.

Negative voltage from the power supply 24 is applied through a resistance 76 to the cathodes of the tubes 44 and 50. The plate of the tube 44 is connected to the grid of a tube 78 and to the movable contact of a potentiometer 80 which is in series with a resistance 82 and the power supply 56. Positive voltage from the power supply 56 is applied to the plate of the tube 50 through a resistance 86.

The cathodes of the tubes 74 and 78 are grounded and the plates are connected to one side of solenoids 88 and 90, respectively, having their other side connected to the power supply 56. Ganged switches 92, 94, 96 and 98 are associated with the solenoid 88, the switch 92 being normally closed and the other switches being normally open, and ganged switches 100, 102, 104, 106, 108 and 110 are associated with the solenoid 90. The switch 102 is normally closed and the other switches are normally open.

The movable contact of the switch 92 is connected to the left terminal of a light bulb 112 having its right terminal connected to corresponding terminals of bulbs 114 and 116. As disclosed in co-pending application Serial No. 159,105, filed April 29, 1950, by Fred N. Blackmore and Donald Clinton, the light bulbs 112, 114 and 116 are suitably positioned within the indicator 60 to cast distinctively colored lights on the face of the indicator when they are energized. For example, the light bulb 112 may cast a white light, the bulb 114 a green light and the bulb 116 a red light. Power for the bulbs 112, 114 and 116 is supplied by a filament power supply 117.

A plurality of scales 118, 120 and 122 are provided on the face of the indicator 60 and are distinctively colored in accordance with the colored illumination cast by the light bulbs. Each scale has a progressively increasing range. For example, the white scale 118 may provide indications between 0 and 5 milliroentgens per hour, the green scale 120 indications between 0 and 50 milliroentgens per hour, and the red scale 122 indications between 0 and 2000 milliroentgens per hour.

The stationary contact of the switch 92 is connected to the stationary contact of the switch 94, the movable contact of which is connected to the left terminal of the bulb 114, and is also connected to the movable contact of the switch 102, which has its stationary contact grounded. Connections are made from the stationary contact of the switch 96 to the left terminal of the indicator 60 and from the movable contact of the switch to the movable contact of a potentiometer 124 having one of its stationary contacts connected to the right terminal of the indicator 60. The movable contact of the switch 98 is grounded and the stationary contact is connected to one side of a warning indicator 126, the other side of which is connected through a resistance 128 to the power supply 56. The indicator 126 may be located at a position removed from the ionization chamber 10 to provide a suitable warning when the radioactivity approaches an intensity providing a moderate danger. For example, the indicator 126 may be located in the cockpit of an airplane to provide a distinctive sound or to provide a green light corresponding to the color of the bulb 114 and the scale 120 when the intensity of radioactivity becomes dangerous in the body of the plane.

The movable contact of the switch 100 has voltage from the power supply 56 applied to it through a resistance 130 and the stationary contact is connected to a grounded solenoid 132. A normally open switch 134 is actuated by the solenoid 132 and is connected across the resistance 18. The stationary contact of the switch 104 is grounded and the movable contact is connected to the left terminal of the light bulb 116. The stationary contact of the switch 106 is connected to the left terminal of the indicator 60 and the movable contact is connected to the movable contact of a potentiometer 136, a stationary contact of which is connected to the right terminal of the indicator 60.

Connections are made from the stationary contact of the switch 108 to the common terminal between the resistance 80 and the potentiometer 82 and from the movable contact of the switch to the power supply 56. The movable contact of the switch 110 is grounded and the stationary contact is connected to one side of a warning indicator 138. The other side of the indicator 138 is connected through a resistance 140 to the power supply 56. The indicator 138 provides a warning, either visual or audible, to indicate that the radioactivity is approaching a level of severe danger. This warning is different from the warning provided by the indicator 126.

Each radioactive pulse, such as a gamma radiation, which penetrates the ionization chamber 10 from the space surrounding the chamber imparts sufficient energy to the walls of the chamber to cause some of the electrons to break away from the inner wall. The electrons leaving the cylindrical wall 12 travel into the chamber before being attracted back to the cylindrical wall by the positive voltage on the wall relative to the negative potential on the rod 14. Some of the electrons strike molecules of argon during their cycle of travel and produce an ionization of the argon molecules into electrons and positive ions.

The electrons produced from the argon are attracted towards the cylindrical wall 12 and the positive ions are attracted towards the rod 14. As a result, an electric current is produced which flows through the resistances 16, 18, 28, 32 and 34. Practically all of the voltage produced by the ionization current occurs across the resistances 16 and 18, since the resistances 16 and 19 are considerably greater than the resistances 28, 32 and 34. This voltage difference, which is in the order of a millivolt, produces an increase in the voltage on the grid of the tube 26 and causes the current through the tube to increase.

Before the apparatus shown in Figure 1 is placed in operation, the tubes 26 and 30 are matched to have substantially identical operational characteristics. Therefore, for a condition of no radioactivity, substantially equal currents flow through the tubes and produce equal voltages on the tube plates, since the voltages applied on corresponding elements of each tube are substantially equal. However, when a voltage drop is produced across the resistances 16 and 18 by the ionization current, the current through the tube 26 increases and causes the voltage on the plate of the tube 26 to drop below the voltage on the plate of the tube 30. The difference in the voltages on the plates of the tubes 26 and 30 is substantially proportional to the intensity of radioactivity over a wide range of values. The substantially linear characteristic of the tube 26 is illustrated in Figure 2, which shows how the voltage on the plate of the tube varies from a normal value, indicated at 142, when changes appear in the voltage on the grid.

The voltage on the plate of the tube 30 controls the current through the tube 46. This current flows through a portion of the potentiometer 62 and through the resistance 64 and produces a predetermined voltage on the cathode of the tube. The voltage which appears on the cathode of the tube 40 is dependent upon the voltage on the cathode of the tube 46 since the resistance 64 is common to both tubes. The current which flows through the tube 40 is in turn dependent upon the difference in the voltages on the cathode and grid of the tube, the grid voltage being introduced from the plate of the tube 26. Since the resistance 64 is common to the tubes 46 and 40, the tube 46 provides a stabilizing action on the operation of the tube 40. This stabilizing action is instrumental in minimizing any errors which result from changes in the reference voltage applied from the plate of the tube 30 to the grid of the tube 46.

Since the difference in the voltages on the plates of the tubes 46 and 40 is controlled by the difference in the voltages on the plates 26 and 30, it is also proportional to the intensity of radioactivity. This difference in voltages is produced by a gradual cutting-off of the tube 40 as the intensity of radioactivity increases, causing the voltages on the plate of the tube 40 to increase gradually above the voltage on the plate of the tube 46. The voltage difference appears across the indicator 60 and produces a proportionate deflection of the pointer positioned in the face of the indicator. The sensitivity of movement of the pointer for different intensities of radioactivity is dependent upon the shunting action provided by the potentiometer 58, which is connected directly across the indicator. The sensitivity of the indicator is generally adjusted before the initial operation of the apparatus disclosed above and is only occasionally adjusted thereafter.

The reference voltage on the plate of the tube 30 is also introduced to the grid of the tube 48 so that the tube 48 will provide a reference voltage for the tube 42. The voltage on the grid of the tube 48 causes current to flow through the tube and the resistance 66 of such value that a slightly positive voltage is produced on the cathodes of the tubes 48 and 42 relative to the voltage on the grid of the tube 42 even when no radioactivity is present in the locality. This causes a moderate current to flow through the tube 42 when no radioactivity is present and the voltage on the plate of the tube to be depressed somewhat below the voltage from the power supply 56 because of the voltage drops produced across the potentiometer 68. As the intensity of radioactivity increases, however, the voltage on the grid of the tube 42 decreases and produces a gradual cutting-off of the tube. This causes the voltage on the plate of the tube to gradually rise. The initial voltage on the plate of the tube for a condition of no radioactivity and the change in voltage with variations in radioactivity can be adjusted by varying the position of the movable contact on the potentiometer 68.

The voltage on the grid of the tube 74, which is normally cut off, increases with rises in the voltage on the plate of the tube 42. At a voltage corresponding to a predetermined intensity of radioactivity, such as 5 milliroentgens per hour, current starts to flow through the tube 74 from the power supply 56. The current through the tube 74 also flows through the solenoid 88 and energizes the solenoid, causing the switch 92 to open and the switches 94, 96 and 98 to close. When the switch 92 opens, the continuous circuit through the bulb 112 is interrupted to indicate that the scale 118 should no longer be read because the intensity of radioactivity has brought the pointer to the end of the scale.

At the same time that the circuit to the bulb 118 is interrupted, the switch 96 closes and places the potentiometer 124 in parallel with the potentiometer 58 and the indicator 60. Since the potentiometer 124 has a considerably smaller value than the potentiometer 58, it reduces the sensitivity of the indicator 60 and causes the indicator to measure the medium range of radioactivity covered by the scale 120 instead of the relatively narrow range covered by the scale 118. The bulb 114 is simultaneously illuminated by current flowing through a continuous circuit including the filament voltage supply 117, the light bulb 114, the switch 94 and the switch 102. Illuminating the light bulb 114 causes a green light to be cast upon the face of the indicator 60 to specifically point out that the scale 120 should be read. The indicator 126 is also operated through a circuit including the power supply 56, the resistance 128, the indicator 126 and the switch 98 to provide an external warning that the radioactivity has an intensity of moderate danger.

The tubes 44 and 50 operate in the same manner as the tubes 42 and 48 and cause the voltage on the plate of the tube 44 to increase gradually as the intensity of radioactivity increases. When the voltage on the plate of the tube 44 approaches a value corresponding to the maximum range of the scale 120, the normally cut-off tube 78 starts to conduct. The current through the tube 78 also flows through the solenoid 90 and energizes the solenoid, causing the switch 102 to open and the switches 100, 104, 106, 108 and 110 to close. Upon the closure of the switch 100, a continuous circuit is established which includes the power supply 56, the resistance 130, the switch 100 and the solenoid 132. The resultant current through the solenoid 132 causes the switch 134 to close and the resistance 18 to be shorted.

The resistance 18 is shorted at an intensity of radioactivity corresponding to the beginning of a non-linear response by the tube 26, as illustrated at 144 in Figure 2. The non-linear response results when a large ionization current flows through the resistances 16 and 18 and produces a voltage which makes the voltage on the grid of the tube 26 more positive than the voltage on the cathode. The positive voltage on the grid of the tube 26 causes the grid, rather than the plate, to receive any increase in electrons from the cathode. By shorting the resistance 18, the voltage on the grid of the tube decreases for a given ionization current and produces a reduction in the difference between the voltage on the plate of the tube 26 and the reference voltage on the plate of the tube 30. This causes the response of the tube 26 to drop from the non-linear region 144 to a level 146 in the linear region below the level 142. In this way, the effective range of linear response is considerably increased.

The switch 108 closes at the same time as the switch 134 and shorts the resistance 82 to compensate for the shorting of the resistance 18. With the resistance 82 shorted, the sensitivity of response of the tube 44 increases, and the voltage on the plate of the tube 44 remains at approximately the same value for a radioactivity corresponding to the end of the scale 120 as the value before the resistance 18 was shorted. Because of the maintenance of the same voltage on the plate of the tube 44, the bias on the grid of the tube 78 continues to remain unchanged and current flows through the tube to maintain the solenoid 90 energized. However, current stops flowing through the solenoid 88 because of a decrease in voltage on the plate of the tube 42. Since the solenoid 88 is no longer energized, the switches 94 and 98 open to interrupt the circuits to the bulb 114 and warning indicator 126, respectively.

Closure of the switch 106 when the solenoid 90 becomes energized places the potentiometer 136 in parallel with the potentiometer 58 and the indicator 60. The potentiometer 136 has a lower value than either the potentiometer 58 or the potentiometer 124, and increases the indicator range to conform with the scale 122. The switch 104 closes at the same time as the switch 106 and establishes a continuous circuit which includes the filament power supply 117, the bulb 116 and the switch. The resultant illumination of the bulb 116 causes a red light to be cast on the face of the indicator 60 to specifically point out that the scale 122 should be read. The warning indicator 138 is also simultaneously operated by the closure of the switch 110.

The apparatus disclosed above has several important advantages. It accurately measures the intensity of radioactivity over a wide range of values by providing a reference voltage and comparing a variable voltage with the reference voltage. The apparatus operates to vary the second voltage in accordance with the intensity of radioactivity in the vicinity of an ionization chamber and also in accordance with any slight changes in the reference voltage. By comparing the variable voltage with the reference voltage, a direct and accurate indication of the intensity of radioactivity over a relatively wide range of values is obtained. The range of accurate measurement is further widened by altering the sensitivity of the apparatus as it approaches the region of non-linearity, so that the apparatus in effect operates through its linear range at least twice as it measures increasing intensities of radioactivity. The accuracy of the measurements is not materially altered by any changes in temperature or humidity which may be encountered.

The apparatus disclosed above also provides an indicator having different scales, each scale being adapted to measure the intensity of radioactivity over progressively increasing values. A switching circuit is associated with the indicator to alter the sensitivity of the indicator in accordance with the scale to be read. The switching circuit is in turn operated by solenoids, each of which is prevented from having any current flow through it until an intensity of radioactivity is reached corresponding to the maximum range of a particular scale. By preventing any current from flowing through each solenoid until its actuation is required, a positive operation of the switching circuit is insured.

In addition to the above advantages, the apparatus is relatively light and inexpensive. These features are especially important in making the apparatus available for many different uses, civilian as well as military. The relative simplicity of the apparatus also facilitates its widespread use, since the apparatus may be operated for long periods of time with a minimum amount of repair and a maximum amount of reliability.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A system for measuring the intensity of radioactivity, including, an ionization chamber for producing an electrical current proportional to the intensity of radioactivity, a relatively high resistance connected to the ionization chamber to produce a voltage proportional to the current through the chamber, a pair of tubes each having a cathode, a grid and a plate, the grid and cathode of the first tube being connected across the resistance, means for biasing the grids of the tubes with equal voltages relative to the cathodes for a condition of no radioactivity, an indicator connected to the plate of each tube to measure the difference in voltages caused by the flow of current through the resistance, a plurality of scales on the indicator, means for adjusting the sensitivity of the indicator to change from one scale to another scale having an increased range when the indication is at the end of the first scale and for instantaneously pointing out the scale to be read, means for partially shorting the resistance when the response of the first tube becomes non-linear and means for compensating for the reduction in voltage produced by the partial shorting of the resistance so as to provide a proper reading of the indicator.

2. A system for measuring the intensity of radioactivity, including, an ionization chamber for converting radioactive emanations into an electrical current proportional to the intensity of the radioactivity, means for providing a reference voltage, variable means operative to produce a voltage different from the reference voltage by a value proportional to the electric current, means common to the reference means and the variable means to substantially eliminate the effects on the voltage difference of any variations in the reference voltage, an indicator connected to the variable means and to the reference means, a plurality of scales, each scale being adapted to indicate a different range of radioactivity, and means operative in accordance with the difference voltage to adjust the sensitivity of the indicator for readings at the end of one scale and to instantaneously point out the next scale to be read.

3. A system for measuring the intensity of radioactivity, including, means for producing a current proportional to the intensity of radioactivity, means for converting the current into a proportionate voltage, means connected to the conversion means for indicating the voltage level, a plurality of scales on the indicating means for covering different ranges of radioactivity, a plurality of solenoids, means for normally preventing the flow of current through each solenoid, means operative at a predetermined voltage level for each solenoid to produce a flow of current through the solenoid, and means operative by each solenoid upon the flow of current through the solenoid to reduce the sensitivity of the indicating means so as to increase its range.

4. A system for measuring the intensity of radioactivity, including, an ionization chamber for producing an electrical current proportional to the intensity of radioactivity, means for converting the electrical current into a proportionate voltage, means for indicating the voltage, the indicating means having a plurality of scales, a plurality of solenoids, means for normally preventing an energizing current from flowing through each solenoid, means operative at predetermined voltages to energize the solenoids, means operative by each solenoid to provide a change from one scale to another scale having an increased range, and means operative by each solenoid to provide an instantaneous indication of the scale to be read.

5. A system for measuring the intensity of radioactivity, including, an ionization chamber for producing an electrical current substantially proportionate to the intensity of radioactivity, a relatively high resistance connected to the ionization chamber to produce a voltage substantially proportionate to the current through the chamber, a first tube, a second tube, a power supply, the first tube being connected to the resistance and to the power supply to provide a relatively constant reference voltage, the second tube being connected to the resistance and to the ionization chamber to provide a variable voltage different from the reference voltage by a magnitude substantially proportionate to the voltage across the resistance, a third tube having a cathode, grid and plate, the grid of the third tube being connected to the first tube to receive the reference voltage from the first tube, a fourth tube having a cathode, grid and plate, the grid of the fourth tube being connected to the second tube to receive the variable voltage from the tube, the third and fourth tubes having a common cathode resistance to minimize any effects on the fourth tube of variations in the reference voltage from the second tube, and an indicator connected between the plates of the third and fourth tubes to measure the difference in the output voltages from the tubes.

6. A system for measuring the intensity of radioactivity, including, an ionization chamber for producing an electrical current substantially proportionate to the intensity of radioactivity, a relatively high resistance connected to the ionization chamber to produce a voltage substantially proportionate to the current through the chamber, reference means for providing a substantially constant reference voltage, variable means connected to the resistance for providing a voltage variable relative to the reference voltage in accordance with the value of the electrical current, first and second tubes connected respectively to the reference means and the variable means to produce a voltage indicative of any difference in the voltages provided by the reference and variable means, impedance means common to the first and second tubes to substantially eliminate the effects on the voltage difference of any variations in the reference voltage applied to the first tube, and measuring means connected to the first and second tubes for indicating the difference in the voltages between them.

7. A system for measuring the intensity of radioactivity, including, an ionization chamber for producing an electrical current proportional to the intensity of radioactivity, a relatively high resistance connected to the ionization chamber to produce a voltage proportional to the current through the chamber, a first tube for providing a substantially constant reference voltage, a second tube connected to the first tube for providing a voltage equal to the reference voltage for a condition of no radioactivity and connected to the resistance to provide a variation from the reference voltage by an amount dependent upon the voltage produced across the resistance, variable means connected to the first and second tubes to produce a voltage proportional to the difference in the voltages provided by the first and second tubes, an indicator connected to the variable means to measure the voltage produced by the variable means, means for reducing the value of the resistance upon a non-linear response of the second tube, and means for providing a corresponding adjustment in the sensitivity of the indicator upon the reduction in the value of the resistance.

8. A system for measuring the intensity of radioactivity, including, means for converting radioactive emanations into an electrical current proportional to the intensity of radioactivity, a relatively high impedance connected to the conversion means for producing a voltage proportional to the electrical current, a first tube for providing a reference voltage having a substantially constant amplitude, a second tube connected to the first tube and to the impedance for providing an output voltage variable relative to the reference voltage in accordance with the value of the voltage across the impedance, a third tube connected to the first tube to receive the output voltage from the first tube, a fourth tube connected to the second tube for providing between the third and fourth tubes a voltage substantially proportionate to the difference in the voltages between the first and second tubes, an impedance common to the third and fourth tubes for substantially eliminating the effects on the voltage difference of any variations in the reference voltage, and an indicator connected to the third and fourth tubes for measuring the difference voltage.

References Cited in the file of this patent

UNITED STATES PATENTS

| Number | Name | Date |
|---|---|---|
| 2,181,728 | Greentree | Nov. 28, 1939 |
| 2,469,460 | Fearon | May 10, 1949 |
| 2,491,904 | Poole | Dec. 20, 1949 |
| 2,541,039 | Cole | Feb. 13, 1951 |
| 2,609,512 | Conviser | Sept. 2, 1952 |

FOREIGN PATENTS

| Number | Country | Date |
|---|---|---|
| 556,177 | Great Britain | Sept. 23, 1943 |

OTHER REFERENCES

A Pulse Analyser for Nuclear Research, Freundlich et al., Rev. of Scientific Instr. February 1947, vol. 18, #2, pp. 90–100.